United States Patent [19]

Erkens et al.

[11] Patent Number: 4,921,541

[45] Date of Patent: May 1, 1990

[54] ORTHORHOMBIC GREENISH-TINGED LEAD CHROMATE PIGMENTS

[75] Inventors: Leonardus J. H. Erkens, Maastricht; Herman J. J. M. Geurta, Kerkrade, both of Netherlands; Jean L. G. M. Vandevenne, Bilzen, Belgium; Gerben P. Algra, Maastricht, Netherlands

[73] Assignee: Ciba-Geigy Corporation, Ardsley, N.Y.

[21] Appl. No.: 198,268

[22] Filed: May 25, 1988

[30] Foreign Application Priority Data

Jun. 4, 1987 [CH] Switzerland ..................... 2115/87

[51] Int. Cl.$^5$ ................................................ C09C 1/20
[52] U.S. Cl. ..................................... 106/433; 423/619
[58] Field of Search ........................ 106/433; 423/619

[56] References Cited

U.S. PATENT DOCUMENTS

| | | | |
|---|---|---|---|
| B 324,879 | 1/1975 | Jackson | 106/298 |
| 2,023,928 | 12/1935 | Lederle et al. | 106/433 |
| 2,275,054 | 3/1942 | Stockdale et al. | 106/433 |
| 2,808,339 | 10/1957 | Jackson | 106/433 |
| 2,813,039 | 11/1957 | Bishop | 106/433 |
| 3,370,971 | 6/1968 | Linton | 106/298 |
| 3,639,133 | 1/1972 | Linton | 106/298 |
| 3,923,538 | 12/1975 | Jackson | 106/433 |
| 4,046,588 | 9/1977 | Einerhand et al. | 106/298 |
| 4,115,143 | 9/1978 | Batzar | 106/433 |
| 4,127,421 | 11/1978 | Ferrill, Jr. | 106/433 |
| 4,247,338 | 1/1981 | Ziobrowski | 106/433 |

FOREIGN PATENT DOCUMENTS 0169810 1/1986 European Pat. Off.

OTHER PUBLICATIONS

Vogel's Textbook of Quantitive Inorganic Analysis, IV Ed., Basset et al., N.Y. 1978 (pp. 504-507).
Volumetric Analysis, vol. III, Titration Methods, Koltoff et al., N.Y. 1975, pp. 237-239.

*Primary Examiner*—Paul Lieberman
*Assistant Examiner*—Willie J. Thompson
*Attorney, Agent, or Firm*—Stephen V. O'Brien

[57] ABSTRACT

Orthorhombic greenish-tinged lead chromate pigments containing lead chromate and lead sulfate in a weight ratio of 91:9 to 100:0 and distinguished by a tinctorial strength of 0.053 to 0.066 at a standard depth of color of 1/25 in accordance with DIN 53235 are obtainable by mixing an aqueous solution of a lead salt with an aqueous solution of a chromate and, if necessary, of a sulfate under high turbulence in the presence of an aluminium salt and in the absence of zinc salts.

13 Claims, 4 Drawing Sheets

ORTHORHOMBIC GREENISH-TINGED LEAD CHROMATE PIGMENTS

The invention relates to orthorhombic greenish-tinged lead chromate pigments containing lead chromate and lead sulfate in a weight ratio of 91:9 to 100:0, which are distinguished by a very high tinctorial strength in application.

Lead chromate pigments have been used for many years, in particular for dyeing plastic materials and paints.

In contrast to the monoclinic lead chromate pigments which have a stable crystal structure, the orthorhombic lead chromate pigments are less stable. The orthorhombic crystal form can be stabilized by formation of mixed phase crystals with lead sulfate, the stabilizing effect increasing as the content of lead sulfate increases (c.f. Farbe und Lack, 72, No. 10, 1966, page 966).

In the preparation of orthorhombic lead chromate pigments with a low lead sulfate content, attempts have been made to observe certain process conditions as a further stabilizing possibility (c.f. Kittel, "Pigmente" ("Pigments"), (1960), page 279, lines 33 to 40). According to this document [page 278 (lines 1-8)], relatively stable orthorhombic lead sulfochromates with up to 90% of lead chromate can be produced if the procedure is carried out in neutral solution, the concentration does not rise above 1:10, room temperatures are maintained and distilled water is used.

Published U.S. patent application B 324,879 also describes orthorhombic greenish-tinged lead chromate pigments containing 40 to 85% by weight of $PbCrO_4$ and 60 to 15% by weight of $PbSO_4$, small amounts of glacial acetic acid and aluminium and pyrophosphate ions also being used in the synthesis to promote the formation of the orthorhombic crystal structure (c.f. column 2, lines 39–43).

European Patent Application No. 0,169,810 also describes orthorhombic lead chromate pigments. They contain lead chromate and lead sulfate in a weight ratio of 60:40 to 100:0 and have a tinctorial strength of 0.067 to 0.103 with a standard depth of colour of 1:25 in accordance with DIN 53235 and a Yblack/Ywhite opacity factor of 0.78 to 0.87. These pigments are obtained by mixing an aqueous solution containing lead ions and an aqueous solution containing chromate ions and if necessary sulfate ions under high turbulence, it also being necessary, according to the doctrine in this document, to use both zinc salts and aluminium salts during the preparation in order to stabilize the crystal form.

It has now been found that very stable orthorhombic lead chromate pigments or lead sulfochromate pigments containing a small proportion of lead sulfate can be obtained if only aluminium salts are used during their preparation in order to stabilize the crystal structure. They are also distinguished by an exceptionally high tinctorial strength in application.

The present invention accordingly relates to orthorhombic greenish-tinged lead chromate pigments containing lead chromate and lead sulfate in a weight ratio of 91:9 to 100:0, which have a tinctorial strength of 0.066 to 0.053 with a standard depth of colour of 1/25 in accordance with DIN 53235 and are obtainable by mixing an aqueous solution of a lead salt with an aqueous solution of a chromate and, if necessary, of a sulfate under high turbulence in the presence of an aluminium salt and in the absence of zinc salts.

Orthorhombic lead chromate pigments in which the weight ratio of lead chromate to lead sulfate is 94:6 to 98:2 are preferred.

The aqueous lead salt solution used is, for example, a lead acetate solution or, in particular, lead nitrate solution, the aqueous chromate solution used is, for example, a sodium or potassium chromate or in particular a sodium bichromate solution, and the aqueous sulfate solution used is, for example, a sodium, potassium or ammonium sulfate solution. The concentrations of the lead salt solution and the chromate or chromate/sulfate solutions can vary over a considerable range. In general, the concentrations are about 0.3 to 1.2 mol of lead ions per liter, and 0.5 to 6 mol of chromate ions per liter. Lower concentrations may be an economic disadvantage, whilst at higher concentrations it generally becomes difficult to obtain uniform precipitates.

Aluminium salts which can be used are, for example, aluminium sulfate, nitrate, acetate or chloride, and aluminates, such as sodium, potassium and ammonium aluminate, or mixtures thereof. However, sodium aluminate is preferred.

It is in principle possible to use the aluminium salt, for example, as a separate aqueous solution or to mix it as an aqueous solution with the aqueous lead salt solution or with the aqueous chromate or, if necessary, chromate/sulfate solution and then to combine the two solutions (lead salt solution and chromate or chromate/sulfate solution) according to the Application. Preferably, however, the aluminium salt is present in the chromate solution or, if necessary, in the chromate/sulfate solution. In another possibility, both the lead solution and the chromate solution or if appropriate the chromate/sulfate solution contain aluminium ions.

The amount of the aluminium salt can be varied as required. Small amounts of aluminium salt, for example from one-tenth to one-fiftieth of the stoichiometric amount of lead salt suitable according to the invention, are advantageously used.

The high turbulence can be achieved in various ways, for example by a high flow rate or intensive mechanical stirring.

High flow rates can be achieved, for example, by a procedure in which the solutions to be mixed are continuously combined in a mixing nozzle.

This is to be understood as a device in which the solutions to be mixed are combined with one another in a relatively small space, at least one solution being fed through a nozzle, preferably under increased pressure. The mixing nozzle can be constructed, for example, in accordance with the principle of the water pump, the feed of one liquid into the mixing nozzle corresponding to the feed of water into the water pump (inlet a) according to FIG. 1 and the feed of the other liquid into the mixing nozzle corresponding to the connection to the vessel to be evacuated in the water pump (inlet b) according to FIG. 1, this latter feed of liquid also being under increased pressure, if appropriate.

To carry out the precipitation in the mixing nozzle, the aqueous solution containing the chromate and if necessary the sulfate is advantageously combined continuously at a flow rate of at least 4.9 m/second with the aqueous solution of the lead salt at a flow rate of at least 0.08 m/second, preferably at room temperature. The precipitation is preferably carried out at room temperature and a pH of 2–5, advantageously in the presence of an excess of lead ions of 0.003–0.012 mol per liter above the stoichiometric amount. The product leaves the mixing nozzle through discharge (c) according to FIG. 1.

Apparatuses which are suitable for intensive mechanical stirring are, for example, commercially available high-performance stirrers, for example the Ultra-Turrax from Janke und Kunkel AG, Staufen, FRG, the Ystral from Ystral GmbH, Ballrechten-Dottingen, FRG, the Polytron from Kinematica, Kriens-Luzern, CH, the Silverson stirrer from Silverson Mach Ltd., Chesham/UK or the Chemcol mixer from Chemiecolor AG, Kilchberg-Zürich, CH. Other types of high-performance stirrers which can also be used are, amongst others, the Pendraulik from Pendraulik Maschinen und Apparate GmbH, Bad Münder am Deister, FRG and flow mixers, for example those from Gronfa Process Technik BV/Rozendaal, NL.

It is important here for the solutions on the one hand of the lead salt and on the other hand of the chromate and if necessary of the sulfate to be added in the immediate vicinity of the shaft in the rotor of the high-performance stirrer. Mixing of the two main components in the turbulent zone can be effected either continuously by simultaneous feeding or discontinuously by taking one component and metering in the second. In the first case, on the one hand the chromate solution or the chromate/sulfate solution and on the other hand the lead salt solution are advantageously fed through two separate lines into the immediate vicinity of the shaft in the rotor. In the second case, for example, the lead salt solution is taken and the chromate solution or the chromate/sulfate solution is added through a tube into the immediate vicinity of the shaft in the rotor of the high-performance stirrer. It should be ensured that when the precipitation has ended, an excess of lead ions of 0.003–0.012 mol/liter above the stoichiometric amount is present.

High-performance stirrers are preferred according to the invention. There is a considerable range of possible variants for the conditions used for the reaction/precipitation. In general, the reaction is carried out so that the various aqueous solutions are mixed at temperatures of 0° to 80° C., preferably 15° to 80° C., the final pH after the reaction preferably being in the acid range, preferably between 1.5 to 5. The total time for the reaction can also vary according to the size of the batch, but is in general up to 3 hours.

The orthorhombic lead chromate pigments precipitated are distinguished by a fine particle size.

Ageing, for example by leaving to stand at room temperature or by heating, for example up to 35° C., has proved advantageous for better formation of the crystals.

To improve the pigment properties, such as, for example, the stability to heat, light and chemical attack, it is advantageous to coat the pigment particles with a protective coat during precipitation or by after-treatment by known processes, for example those described in U.S. patent specification 3,370,971, 3,639,133 and 4,046,588. For this purpose, inorganic compounds, for example compounds of aluminium, titanium, antimony, cerium or silicon or mixtures thereof, are precipitated on the pigment.

The amount of coating agent is advantageously 2–40, preferably 2–20 and in particular 3–10%, based on the total weight of the pigment.

The orthorhombic lead chromate pigments obtained can additionally be treated with agents to improve their texture, for example with long-chain aliphatic alcohols, esters, acids or salts thereof, amines, amides, waxes or resinous substances, such as abietic acid or hydrogenation products, esters or salts thereof, and furthermore with nonionic, anionic or cationic surface-active organic agents.

The lead chromate pigments according to the invention are worked up in the customary manner, for example by filtration, washing out the filter cake with water to remove soluble salts, drying and pulverizing.

The lead chromate pigments according to the invention are distinguished by a very high tinctorial strength.

The tinctorial strength is expressed as the ratio of a coloured pigment in a varnish to be applied to the white pigment ($TiO_2$) which leads to the standard depth of colour 1/25 in accordance with DIN 53235. This ratio thus gives that amount of coloured pigment which, when mixed with a given amount of white pigment, allows production of a varnish coloration at a standard depth of colour of 1/25.

The orthorhombic lead chromate pigments according to the invention furthermore have a good light stability and high saturation, coupled with a high tinctorial strength, in application. In spite of their high tinctorial strength, they are moveover distinguished by good flow properties of the printing inks and varnishes prepared therefrom.

The lead chromate content is determined, after breaking down the pigment, in accordance with the method described in "Volumetric Analysis, Volume III, Titration Methods" by I. M. Kolthoff, R. Belcher, V. A. Stenger and G. Matsuyama (Interscience Publishers; New York, 1975).

The lead sulfate content is determined, after breaking down the pigment, in accordance with the method described in "Vogel's Textbook of Quantitative Inorganic Analysis", fourth edition, by J. Basset, R. C. Denney, G. R. Jeffery and J. Mendham (Longman; New York, 1978).

The lead chromate pigments according to the invention can be used individually or as mixtures with one another or with other pigments, for example phthalocyanine blue, molybdate orange or Berlin blue, for pigmenting high molecular weight organic material, for example cellulose ethers and esters, acetylcellulose, nitrocellulose, naturally occurring resins or synthetic resins, such as polymerization or condensation resins, for example aminoplasts, in particular urea- and melamine-formaldehyde resins, phenoplasts, alkyd resins, polyolefins, such as polyethylene or polypropylene, and furthermore polystyrene, polyvinyl chloride, polyacrylonitrile, polyacrylic and polymethacrylic acid esters, polycarbonates, rubber, casein, silicone and silicone resins.

The high molecular weight compounds mentioned can be present either as plastic compositions or melts or in the form of spinning solutions, varnishes or, in particular, printing inks. Depending on the intended use, it proves advantageous to use the novel pigments as toners or in the form of preparations. If they are in the form of preparations, the pigment concentration can be, for example, up to 70% by weight. The lead chromate pigments according to the invention can be used, for example, in an amount of 0.1 to 30% by weight, based on the high molecular weight organic material to be pigmented.

In the following examples and in the description, unless otherwise indicated, parts are parts by weight and percentages are percentages by weight.

EXAMPLE 1

12.5 liters of an aqueous solution containing 503.5 g of lead nitrate and 495 ml of a 10% sodium hydroxide solution are taken in a 25 l reaction vessel with a high-performance stirrer (diameter of the rotor 4.0 cm, peripheral speed of the rotor 17 m/second). 750 ml of an aqueous solution containing 190.8 g of $Na_2Cr_2O_7.2 H_2O$ and 10.3 g of sodium sulfate and 750 ml of an aqueous solution of 6.34 g of sodium aluminate ($NaAlO_2.H_2O$) are simultaneously added through two glass tubes in the immediate vicinity of the shaft in the rotor of the high-performance stirrer at room temperature in the course of 5 minutes.

After the precipitation, the excess of lead is 0.003 mol $Pb^{2+}$/l above the stoichiometric amount. A solution of 47.6 g of titanium oxychloride in 120 ml of water is then added. The pH of the resulting reaction mixture is brought to 6.0 by addition of about 70 g of anhydrous sodium carbonate in 500 ml of water. The precipitate is allowed to settle for 18 hours for maturation of the crystals. The suspension is then stirred for one hour. To coat the pigment particles, a solution of 18.8 g of aluminium sulfate.18 $H_2O$ in 400 ml of water is then added, followed by a solution of 7.6 g of a 75% $H_3PO_4$ solution in 400 ml of water. The final pH is brought to 8.0 by addition of about 90 g of anhydrous sodium carbonate in 500 ml of water. The resulting precipitate is filtered off, washed with water to remove soluble salts and dried at a temperature of 90° C.

Composition of the resulting chromate/sulfate pigment (mixed crystal): 93% of $PbCrO_4$ and 7% of $PbSO_4$. Proportion of the coating in the total weight of pigment: 4%. The tinctorial strength (at a standard depth of colour of 1/25) is 0.066.

Figure 1:
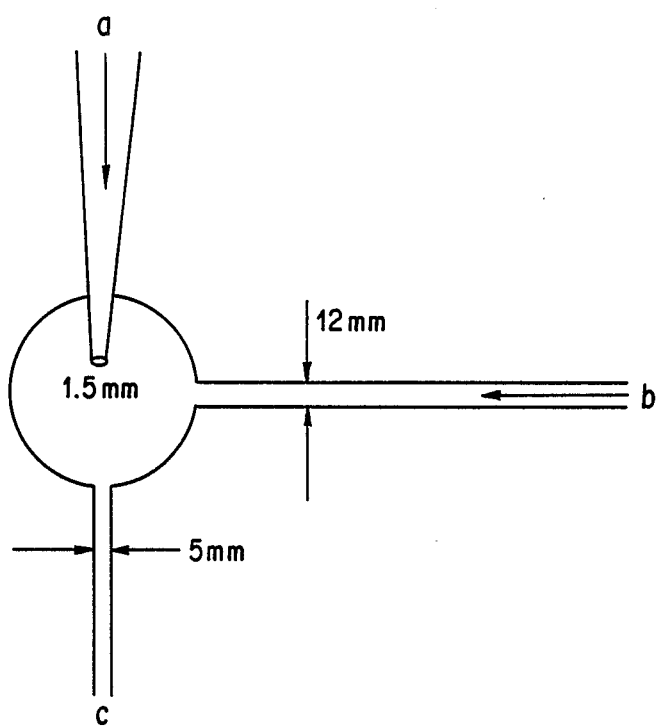
FIG. 1. A mixing nozzle wherein a chromate solution and lead solution are fed in through inlets a and b and the resultant product flows out through c.
Figure 2:
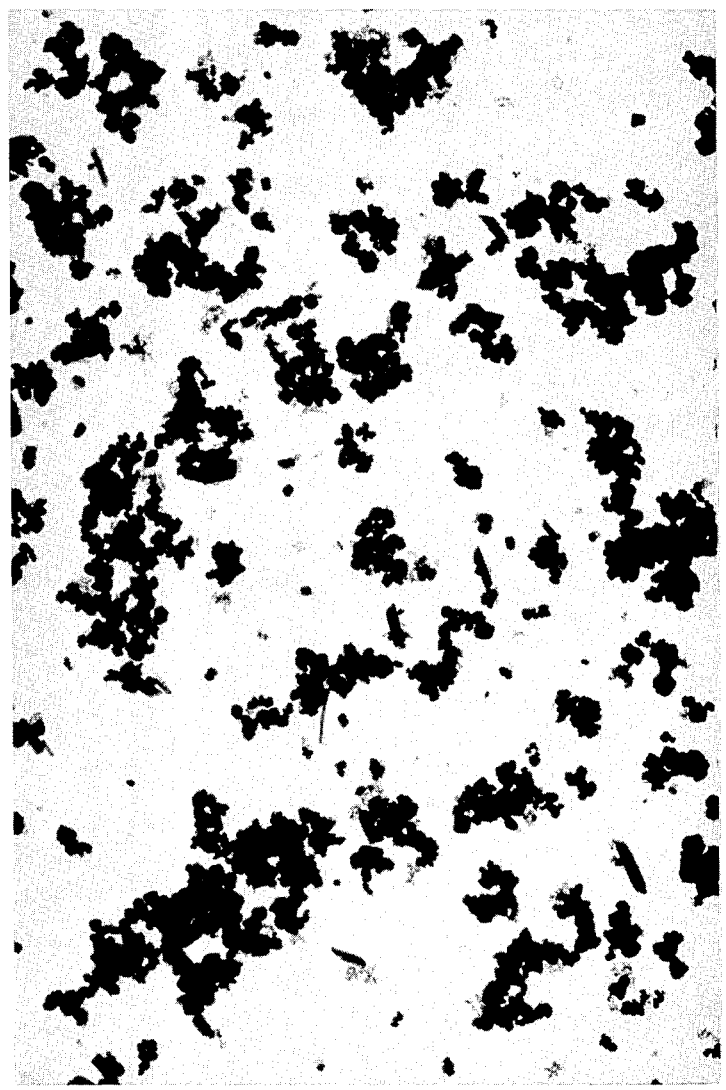
FIG. 2. A photograph of the crystals of Example 1 at a magnification of 20,000.

FIG. 2 shows a photograph of these mixed crystals under an electron microscope at a magnification of 20,000 of the pigment particles dispersed with ultrasound in a 50% ethyl alcohol/water mixture for a few seconds.

The lead chromate content is determined by the following procedure:

0.250 g of lead chromate according to the invention is introduced into a 300 ml conical flask with a ground stopper. 10 ml of 4N sodium hydroxide solution are then added and the mixture is heated until the lead chromate has dissolved completely. The mixture is diluted with 40 ml of distilled water and cooled to room temperature. 0.5 g of sodium carbonate (anhydrous), 4.0 g of potassium iodide and 30 ml of 4N hydrochloric acid are then added. The conical flask is closed immediately with the stopper and if necessary cooled. The mixture is then left to stand in the dark for two hours and is swirled occasionally. 80 ml of distilled water and 0.5 g of sodium carbonate (anhydrous) are subsequently added. The mixture is titrated with sodium thiosulfate by processes which are known per se. Starch flour is additionally added close to the end point of the titration.

The lead sulfate content is determined by the following procedure:

0.5 to 1.0 g of lead chromate according to the invention are weighed very accurately and are mixed together with 6.0 g of sodium carbonate in a 150 ml glass beaker, after which 50 ml of hot water are added. The mixture is boiled until the pigment has dissolved completely. 50 ml of water are then additionally added and the glass beaker is placed on a waterbath (90°–95° C.) for half an hour. The mixture is filtered and the residue is washed with 1% sodium carbonate solution. The filtrate is poured into a 600 ml glass beaker and neutralized carefully with hydrochloric acid until the colour changes, after which 10 ml of hydrochloric acid are additionally added. 10 ml of hydrogen peroxide (3%) are subsequently added and the mixture is boiled for 10 minutes until the hexavalent chromium in the chromate is reduced to trivalent chromium. 50 ml of glacial acetic acid are then added and the mixture is diluted with water to about 400 ml. The solution is heated to 100° C., after which 50 ml of a boiling barium chloride solution (0.1N) are rapidly added. The mixture is analysed for excess barium by processes which are known per se and is heated on a waterbath for two hours. The barium sulfate precipitate is filtered off (filter MN 640 d) and washed with HCl (1:99) and then with hot water until free from chloride. The precipitate is dried at 105°–110° C., incinerated at 800° C. and ignited to constant weight.

The lead chromate content and lead sulfate content are also determined by these methods in all the following examples.

EXAMPLE 2

If a pigment obtained by the process described in Example 1 is prepared in a ration of $PbCrO_4/PbSO_4$ of 98.2% to 1.8% using appropriate amounts of lead, chromate and sulfate, the resulting lead chromate/sulfate pigment (mixed crystal) has a tinctorial strength of 0.062 at a standard depth of colour of 1/25.

Figure 3:
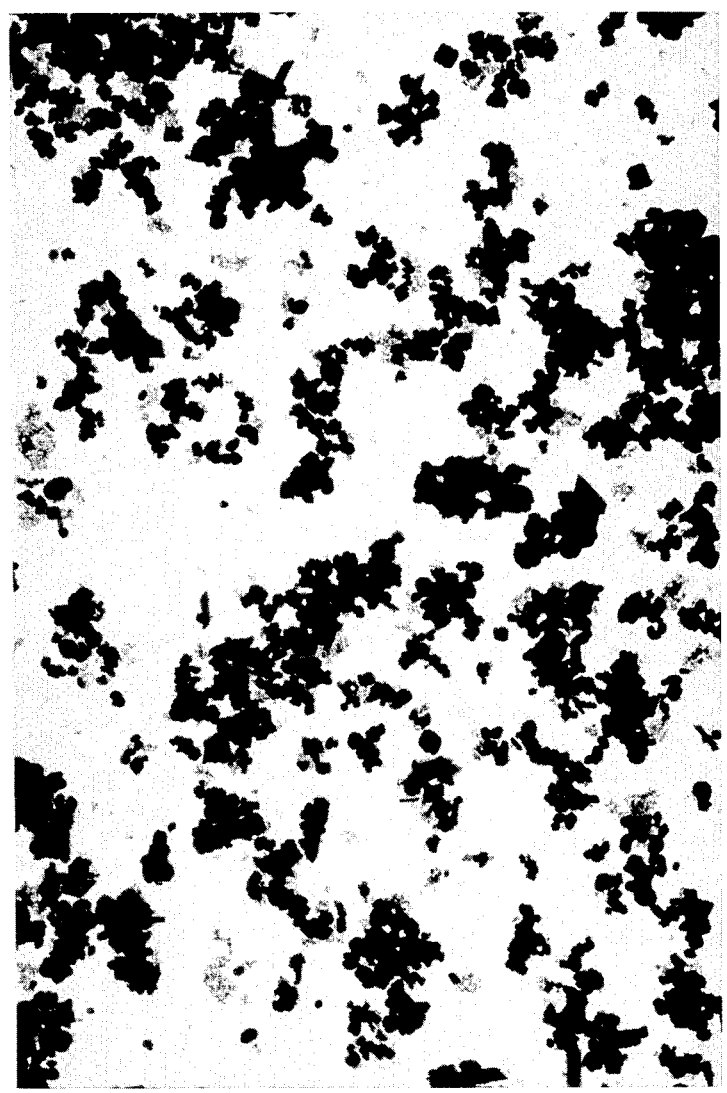
FIG. 3. A photograph of the crystals of Example 2 at a magnification of 20,000.

FIG. 3 shows a photograph of these mixed crystals under an electron microscope at a magnification of 20,000 of the pigment particles dispersed with ultrasound in a 50% ethyl alcohol/water mixture for a few seconds.

EXAMPLE 3

If a pigment obtained by the process described in Example 1 is prepared in a ratio of $PbCrO_4/PbSO_4$ of 99.3% to 0.7% using appropriate amounts of lead, chromate and sulfate, the resulting lead chromate/sulfate pigment (mixed crystal) has a tinctorial strength of 0.055 at a standard depth of colour of 1/25.

Figure 4:
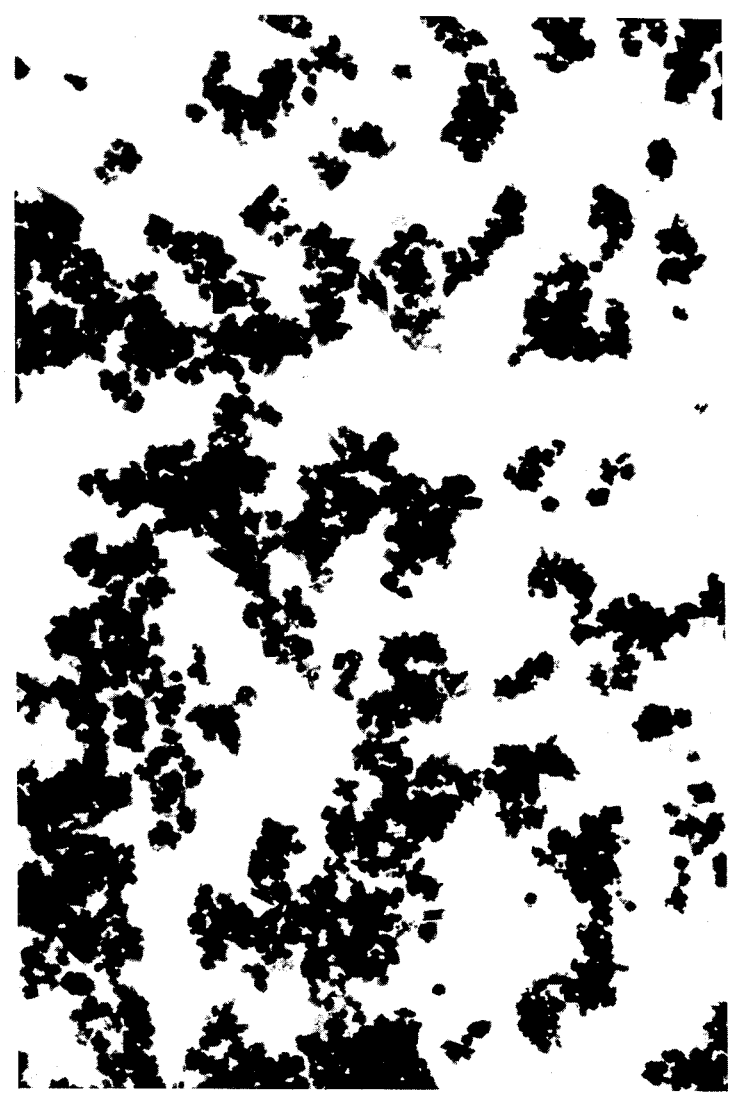
FIG. 4. A photograph of the crystals of Example 3 at a magnification of 20,000.

FIG. 4 shows a photograph of these mixed crystals under an electron microscope at a magnification of 20,000 of the pigment particles dispersed with ultrasound in a 50% ethyl alcohol/water mixture for a few seconds.

EXAMPLE 4 (ALUMINIUM SALT IN THE CHROMATE/SULFATE SOLUTION 12.5 liters of an aqueous solution containing 503.5 g of lead nitrate and 495 ml of a 10% sodium hydroxide solution are taken in a 25 l reaction vessel with a high-performance stirrer (diameter of the rotor 4.0 cm, peripheral speed of the rotor 17 m/second). 750 ml of an aqueous solution containing 190.8 g of $Na_2Cr_2O_7.2H_2O$, 10.3 g of sodium sulfate and 29.2 g of aluminium nitrate $Al(NO_3)_3.9H_2O$ are added through a glass tube in the immediate vicinity of the shaft in the rotor of the high-performance stirrer at room temperature in the course of 5 minutes. After the precipitation, the excess of lead is 0.003 mol of $Pb^{2+}/1$ above the stoichiometric amount. A solution of 47.6 g of titanium oxychloride in 120 ml of water is then added. The pH of the resulting reaction mixture is brought to 6.0 by addition of about 70 g of anhydrous sodium carbonate in 500 ml of water. The precipitate is allowed to settle for 18 hours for maturation of the crystals. The suspension is then stirred for one hour. To coat the pigment particles, a solution of 18.8 g of aluminium sulfate.$18H_2O$ in 400 ml of water is then added, followed by a solution of 7.6 g of a 75% $H_3PO_4$ solution in 400 ml of water and then a solution of 18.8 g of aluminium sulfate.$18H_2O$ in 400 ml of water. The final pH is brought to 8.0 by addition of about 90 g of anhydrous sodium carbonate in 500 ml of water. The resulting precipitate is filtered off, washed with water to remove soluble salts and dried at a temperature of 90° C.

Composition of the resulting chromate/sulfate pigment (mixed crystal): 93% of $PbCrO_4$ and 7% of $PbSO_4$. Proportion of the coating in the total weight of the pigment: 4%. The tinctorial strength (at a standard depth of colour of 1/25) is 0.053.

EXAMPLE 5 (USE OF ALUMINIUM ACETATE)

12.5 liters of an aqueous solution containing 503.5 g of lead nitrate and 495 ml of a 10% strength sodium hydroxide solution are taken in a 25 l reaction vessel with a high-performance stirrer (diameter of the rotor 4.0 cm, peripheral speed of the rotor 17 m/second). 750 ml of an aqueous solution containing 190.8 g of $Na_2Cr_2O_7.2H_2O$ and 10.3 g of sodium sulfate and 750 ml of an aqueous solution of 15.9 g of aluminium acetate $Al(C_2H_3O_2)_3$ are simultaneously added through two glass tubes in the immediate vicinity of the shaft in the rotor of the high-performance stirrer at room temperature in the course of 5 minutes. After the precipitation, the excess of lead is 0.003 mol of $Pb^{2+}/1$ above the stoichiometric amount. A solution of 47.6 g of titanium oxychloride in 120 ml of water is then added. The pH of the resulting reaction mixture is brought to 6.0 by addition of about 70 g of anhydrous sodium carbonate in 500 ml of water. The precipitate is allowed to settle for 18 hours for maturation of the crystals. The suspension is then stirred for one hour. To coat the pigment particles, a solution of 18.8 g of aluminium sulfate.$18H_2O$ in 400 ml of water is then added, followed by a solution of 7.6 g of a 75% $H_3PO_4$ solution in 400 ml of water. The final pH is brought to 8.0 by addition of about 90 g of anhydrous sodium carbonate in 500 ml of water. The resulting precipitate is filtered off, washed with water to remove soluble salts and dried at a temperature of 90° C.

Composition of the resulting chromate/sulfate pigment (mixed crystal): 93% of $PbCrO_4$ and 7% of $PbSO_4$. Proportion of the coating in the total weight of the pigment: 4%. The tinctorial strength (at a standard depth of colour of 1/25) is 0.060.

EXAMPLE 6 (ALUMINIUM SALT IN THE LEAD SALT SOLUTION)

11.0 liters of an aqueous solution containing 38.3 g of lead nitrate $Pb(NO_3)_2$ and 6.34 g of sodium aluminate ($NaAlO_2.H_2O$) are taken in a 25 l reaction vessel with a high-performance stirrer (diameter of the rotor 4.0 cm, peripheral speed of the rotor 17 m/second). 1,500 ml of an aqueous solution containing 190.8 g of $Na_2Cr_2O_7.2H_2O$ and 10.3 g of sodium sulfate and 1,500 ml of an aqueous solution containing 465.3 g of lead nitrate are simultaneously added through two glass tubes in the immediate vicinity of the shaft in the rotor of the high-performance stirrer at room temperature in the course of 5 minutes. During the precipitation, the pH is brought to between 2.5 and 3.0 by addition of about 495 ml of a 10% sodium hydroxide solution. After the precipitation, the excess of the lead is 0.003 mol of $Pb^{2+}/1$ above the stoichiometric amount. A solution of 47.6 g of titanium oxychloride in 120 ml of water is then added. The pH of the resulting reaction mixture is brought to 6.0 by addition of about 70 g of anhydrous sodium carbonate in 500 ml of water. The precipitate is allowed to settle for 18 hours for maturation of the crystals. The suspension is then stirred for one hour. To coat the pigment particles, a solution of 18.8 g of aluminium sulfate.$18H_2O$ in 400 ml of water is then added, followed by a solution of 7.6 g of a 75% $H_3PO_4$ solution in 400 ml of water. The final pH is brought to 8.0 by addition of about 90 g of anhydrous sodium carbonate in 500 ml of water. The resulting precipitate is filtered off, washed with water to remove soluble salts and dried at a temperature of 90° C.

Composition of the resulting chromate/sulfate pigment (mixed crystal): 93% of $PbCrO_4$ and 7% of $PbSO_4$. Proportion of the coating in the total weight of the pigment: 4%. The tinctorial strength (at a standard depth of colour of 1/25) is 0.053.

EXAMPLE 7 (USE OF ONE-SIXTEENTH OF THE AMOUNT OF LEAD SALT EMPLOYED

If the procedure is exactly as described in Example 1, but the amount of sodium aluminate to be employed is increased to 1/16 (9.50 g of $NaAlO_2.H_2O$) instead of 1/24 (6.34 g) of the amount of lead salt, a product of the following composition is obtained (mixed crystal): 93% of $PbCrO_4$ and 7% of $PbSO_4$. Proportion of the coating in the total weight of the pigment: 4%. The tinctorial strength (at a standard depth of colour of 1/25) is 0.058.

EXAMPLE 8 (1/10 OF THE AMOUNT OF ALUMINATE)

If the procedure is exactly as described in Example 1, but the amount of sodium aluminate to be employed is increased to 1/10 (15.2 g of $NaAlO_2.H_2O$) instead of 1/24 (6.34 g), a product with the following composition is obtained (mixed crystal): 93% of $PbCrO_4$ and 7% of $PbSO_4$. Proportion of the coating in the total weight of the pigment: 4%. The tinctorial strength (at a standard depth of colour of 1/25) is 0.062.

EXAMPLE 9 (1/32 OF THE AMOUNT OF ALUMINATE)

If the procedure is exactly as described in Example 1, but the amount of sodium aluminate to be employed is reduced to 1/32 (4.76 g of $NaAlO_2.H_2O$) instead of 1/24 (6.34 g), a product with the following composition is obtained (mixed crystal): 93% of $PbCrO_4$ and 7% of $PbSO_4$. Proportion of the coating in the total weight of the pigment: 4%. The tinctorial strength (at at standard depth of colour of 1/25) is 0.060.

EXAMPLE 10 (1/50 OF THE AMOUNT OF ALUMINATE)

If the procedure is exactly as described in Example 1, but the amount of sodium aluminate to be employed is reduced to 1/50 (3.0 g of $NaAlO_2.H_2O$) instead of 1/24 (6.34 g), a product with the following composition is obtained (mixed crystal): 93% of $PbCrO_4$ and 7% of $PbSO_4$. Proportion of the coating in the total weight of the pigment: 4%. The tinctorial strength (at a standard depth of colour of 1/25) is 0.058.

EXAMPLE 11 (USE EXAMPLE IN LETTERPRESS PRINTING)

1.0 g of the lead chromate pigment obtained according to Example 3 is finely ground on an Engelsmann grinding machine with 4.0 g of a printing varnish of the following composition: 29.4% of linseed oil lithographic oil (300 poise), 67.2% of linseed oil lithographic oil (20 poise), 2.1% of cobalt octoate (8% of Co) and 1.3% of lead octoate (25% of Pb), and is then printed onto art printing paper in an amount of 1 g/m² by the letterpress printing process with the aid of an engraved plate. A strong yellow colour shade with a good depth of colour and a high gloss is obtained.

The pigment is also suitable for other printing processes, such as gravure printing, offset printing and flexographic printing, and likewise gives very good results here.

EXAMPLE 12 (USE EXAMPLE IN PVC)

0.6 g of the pigment obtained according to Example 1 is mixed together with 76 g of polyvinyl chloride, 33 g of dioctyl phthalate, 2 g of dibutyl-tin dilaurate and 2 g of titanium dioxide and the mixture is processed to a thin film on a roll mill at 160° C. in the course of 15 minutes. The greenish-tinged yellow coloration thus produced has a good depth of colour and is stable to migration and light.

EXAMPLE 13 (USE EXAMPLE IN POLYSTYRENE)

0.05 g of the pigment obtained according to Example 1 is mixed with 100 g of polystyrene in the dry state. The mixture is kneaded at temperatures between 180° and 220° C. until homogeneous colouring has formed. The coloured composition is allowed to cool and is ground in a mill down to a particle size of about 2 to 4 mm.

The granules thus obtained are processed to shaped articles in an injection moulding machine at temperatures between 220° and 300° C. Greenish-tinged yellow-coloured compositions of good stability to light and heat are obtained.

EXAMPLE 14 (USE EXAMPLE IN AN ALKYD MELAMINE VARNISH)

60 g of a 60% solution of a non-drying alkyd resin in xylene (trade name Beckosol® 27-320 from Reichold-Albert-Chemie), 36 g of a 50% solution of a melamine-formaldehyde resin in an alcohol-aromatic mixture (tradename) Super-Beckamin® 13-501 from Reichold-Albert-Chemie), 2 g of xylene and 2 g of methylcellosolve are mixed. 100 g of this mixture are stirred with the aid of a stirrer to give a homogeneous varnish solution. 95 g of the clear lacquer thus obtained and 5 g of the pigment obtained according to Example 3 are ground in a bead mill for 72 hours. The coloured varnish is then applied to sheet metal by the customary spraying method and is stoved at 120° C. for 30 minutes. A yellow lacquering of good light stability is obtained.

Production of the coloration to determine the tinctorial strength.

PROCEDURE FOR PRODUCTION OF THE WHITE EXTENDER VARNISH

To determine the tinctorial strength, a varnish coloration is produced in the following manner.

To establish a standard depth of colour of 1/25 in accordance with DIN 53235, an amount of x g of coloured pigment per 10.0 g of titanium dioxide is added.

The following are added in succession to a 100 ml glass container with a lid: 70 g of glass beads (diameter 3 mm), 13.6 g of dispersing medium, x g of coloured pigment and 10.0 g of titanium dioxide (type RCR-2, Tioxid).

The dispersing medium consists of: 34.4% of alkyd varnish (Sigmol® 820, soya phthalate of an alkyd resin, 70% by weight, dissolved in Shellsol® H (white spirit), Necarbo), 47% of solvent (Shellsol® H), 0.3% of dispersing agent [Borchigen® 911 (soya lecithin) from Borchers], 0.8% of antiskin agent (Luaktine, 10% in Shellsol® H), 1.1% of antiflocculant (1% silicone oil in Shellsol® H, Byk-Malinckrodt) and 16.4% of siccative (octanoate salt mixture, 13% of Pb, 65% of Co and 0.9% of Ca).

For dispersion, the glass container and its contents are shaken with a "Red Devil" dispersing apparatus for 10 minutes. 35 parts by weight of Sigmol® 820 are then added and the mixture is dispersed again with the "Red Devil" dispersing apparatus for 10 minutes. A film of varnish is applied to a paint card (carton from Leneta, U.S.A., form 2A and WdX) with a Bird Applicator BA-30 film-drawing apparatus, and is then dried in air for 12 hours (wet film thickness: 80 microns; dry film thickness: 30 microns). The colour measurements are then carried out.

COLOUR MEASUREMENT

The colour measurements are carried out on the varnish applications described. To determine the tinctorial strength, the varnish films are measured only over a white substrate.

Determination of the tinctorial strength on the basis of DIN 53235 has already been described on page 6, lines 11 to 16.

TECHNICAL DATA OF THE MEASURING APPARATUS

Spectrophotometer: Zeiss RFC-3:
Geometry: d/8°;
Measurement opening: 30 mm;
Wavelength: 400–700 nm, every 20 nm.

CALIBRATION

The white standard is prepared from $BaSO_4$ for colour measurement (Merck). For this purpose, a tablet is pressed and the values measured are entered as absolute values. The black standard (Zeiss) is a tube closed on one side and lined with velvet (reflectance 0%).

What is claimed is:

1. An orthorhombic greenish-tinged lead chromate pigment containing lead chromate and lead sulfate in a weight ratio of 91:9 to 100:0, which has a tinctorial strength of 0.066 to 0.053 with a standard depth of color of 1/25 in accordance with DIN 53235 and is obtainable by mixing an aqueous solution of a lead salt with an aqueous solution of a chromate and, if necessary, of a sulfate under high turbulence in the presence of an aluminum salt and in the absence of zinc salts, by using an excess of lead ions of 0.003–0.12 mol per liter above the stoichiometric amount being present during or after the pigment is formed.

2. A lead chromate pigment according to claim 1, obtainable when the aluminium salt is present in the chromate or, if necessary, in the chromate/sulfate solution.

3. A lead chromate pigment according to claim 1, obtainable by using an aluminate as the aluminium salt.

4. A lead chromate pigment according to claim 3, obtainable by using sodium aluminate as the aluminate.

5. A lead chromate pigment according to claim 1, containing lead chromate and lead sulfate in a weight ratio of 94:6 to 98:2.

6. A lead chromate pigment according to claim 1, obtainable by producing the high turbulence by a high flow rate or intensive mechanical stirring.

7. A lead chromate pigment according to claim 1, obtainable by producing intensive mechanical stirring with a high-performance stirrer.

8. A lead chromate pigment according to claim 1, additionally containing texture-improving and/or surface-active organic agents.

9. A lead chromate pigment, obtainable by producing a coating of an inorganic coating agent on the lead chromate pigment according to claim 1 during the precipitation or by an after-treatment.

10. A lead chromate pigment according to claim 9, containing 2–40% of an inorganic coating agent.

11. A lead chromate pigment according to claim 9, containing 2–20% of an inorganic coating agent.

12. A lead chromate pigment according to claim 9, containing 3–10% of an inorganic coating agent.

13. A high molecular weight organic material containing a lead chromate pigment according to claim 1.

* * * * *